Figure 1:
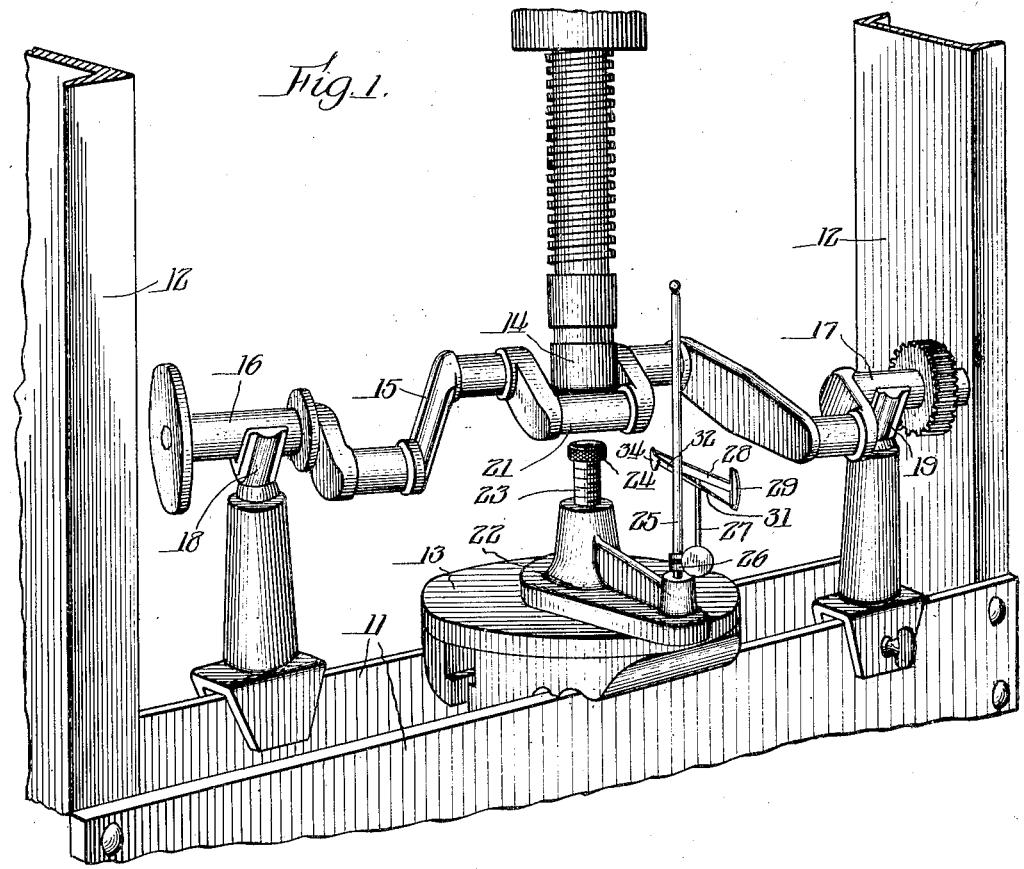

Nov. 2, 1926.

G. E. WEAVER

TRUING APPLIANCE

Filed May 24, 1926

1,605,310

Inventor
Gailard E. Weaver
By Walter M. Fuller
atty

Patented Nov. 2, 1926.

1,605,310

UNITED STATES PATENT OFFICE.

GAILARD E. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TRUING APPLIANCE.

Application filed May 24, 1926. Serial No. 111,094.

In servicing or repairing automobiles, it frequently happens that the crank-shafts thereof are found to be out of round due to burnt-out bearings, or to the fact that the crank-shaft was not properly seasoned before being installed in the automobile, or for other reasons.

This out-of-roundness causes abnormal wear on the bearings and in straightening one of these crank-shafts, considerable difficulty is encountered in getting its center bearing to run perfectly true with its two end bearings, this being especially the fact with crank-shafts having three or five main bearings.

The usual method or procedure of straightening such a shaft is to support it by its two end bearings in V-shaped supports in such a manner that the center bearing comes directly under the ram or plunger of a press.

The crank-shaft is then rotated with an indicator pressing against the center bearing and the high point in rotation in this way is found and is then pressed downward by the ram or plunger of the press beyond its true alignment with the end bearings in the hope that when it springs back, after the pressure is released, the shaft will be straight.

The process of checking the alignment of the shaft is again made with a test indicator and it may be found that the shaft had either been bent too far or not far enough. If it should happen that the shaft has not been bent or sprung far enough, it will be necessary on the next operation to spring it a little beyond its true alignment so that the recoil of the shaft, when the pressure is removed, will cause it to more nearly align with the two end bearings.

It will be readily apparent that it may be necessary to continue this pressing operation indefinitely because of the fact that it is impossible for the operator to be sure of, or to compare, the amount of spring or deflection which he gives to the shaft at each successive operation.

If a support, adjustable as to height, were placed beneath the center bearing of the shaft when the pressure is applied, the support being of such height that when the ram of the press forces the center bearing of the crank-shaft downwardly it will bear directly on top of the support, a positive stop is thus assured, and, if such support is readily adjustable, it is then a simple matter to vary the height of the same and permit the shaft to be bent through a little greater or less distance in order to give the proper alignment.

The present invention aims to provide an adjustable or controllable abutment or stop and an associated indicator or gauge to facilitate the straightening of such crank-shafts and other members out of proper and correct form or shape.

To enable those acquainted with this industry to have a full and complete understanding of the invention, both from structural and functional standpoints, in the accompanying drawing, forming a part of this specification, a present, desirable and preferred embodiment of the invention has been shown, the same reference characters having been applied to like parts in the plurality of views.

Figure 2:
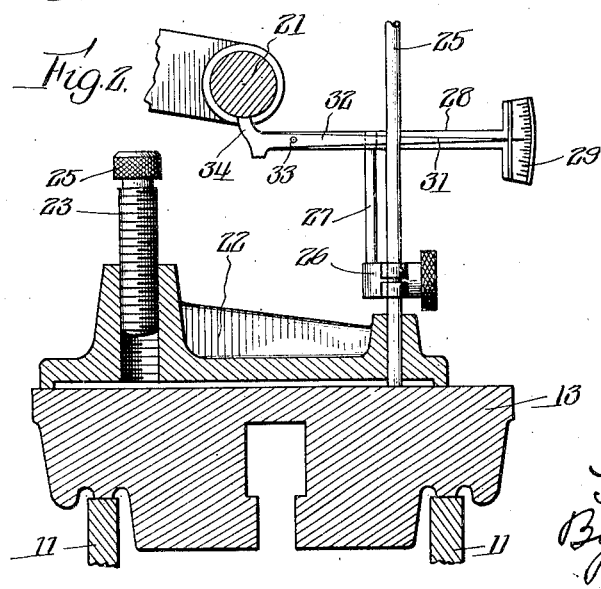

In this drawing:

Figure 1 is a perspective view of the new device indicating how it is used in the straightening of a crank-shaft; and Figure 2 is a longitudinal vertical section through the new appliance and the members with which it is associated when performing its functions.

Referring to this drawing, it will be perceived that the bolster plates 11, 11, uprights or standards 12, 12, supporting bed or plate 13 and the vertically-movable ram or plunger 14 of a suitable press having been shown, the crank-shaft 15 to be straightened or aligned is supported by its end bearings 16 and 17 rotatably mounted in V-shaped members 18 and 19 with the center bearing 21 of the shaft located or positioned above the bed plate 13 and directly below the reciprocatory ram 14 by which the deforming or straightening operation is to be performed.

The appliance incorporating or embodying the instant invention comprises an elongated base member 22 having near one end an internally screw-threaded upstanding boss adjustably accommodating the lower end of a screw-threaded abutment or stop member 23 having an enlarged head 24 with a knurled periphery to facilitate its turning to vary the adjustment and with a top plane or flat bearing surface.

The other end of the base element carries an upright rod 25 fitted with a clamp 26 vertically adjustable thereon and carrying an upright supporting rod 27 supplied at its top end with a cross-piece 28 equipped at one end with a graduated scale 29 with which a pointer or index 31 coacts and which forms a part of a lever 32 fulcrumed at 33 on the element 28 and having an upturned end or section 34 designed to engage the work.

It will be understood that these several cooperating parts constitute the well-known test or universal indicator.

The shaft to undergo treatment having been rotatably-mounted in the manner specified, the eccentricity or out-of-trueness of the central bearing 21 thereof is tested by pushing the base member 22 rearwardly until the end 34 of the indicator is in cooperative relation or contact with the central part of the shaft.

Then, by rotating the latter by hand, the fluctuations or oscillations of the indicator pointer 31 will show the need for correction in the straightness of the shaft.

Thereupon, the base member 22 is shifted forwardly simultaneously carrying the indicator out of the way and bringing the adjustable abutment or stop 23 directly under the center bearing of the shaft and under the ram of the press.

The height of such abutment is then made correct for the work to be done and the ram is brought down on the center bearing of the shaft until the lower side of the latter engages the top flat smooth face of such stop which limits the descent of the shaft and ram, this operation of course bending the shaft downwardly more or less, depending upon the adjustment of such abutment.

Then, after the plunger has been elevated or raised, the appliance is slid back again so that such central bearing section of the shaft may be tested during its rotation by the gauge or indicator which will give a valid clue as to whether or not further bending of the shaft is required and in what degree.

Thus the abutment and indicator may be moved back and forth conjointly to cooperate individually with the same part of the shaft until the latter is properly straightened and rotates within the needed degree of accuracy of alignment with the end bearings of the shaft.

Although I have shown the indicator as adjusted or positioned to coact with the under side of the shaft, obviously it can be used just as effectively with the top or any other part of the shaft which will perform the required function.

From the above description, it will be understood that when the abutment is moved into operative position, the more or less delicate indicator is automatically shifted forwardly, so that there is no danger of its being injured or damaged during the straightening operation.

The employment of the stop or abutment beneath the shaft assures that the same will not be oversprung in the pressing or bending operation and the amount of the deformation to be brought about can be readily predetermined without danger of excessive bending of the shaft.

Those acquainted with this art will readily understand that the invention is susceptible of a variety of embodiments and is not limited to the precise and exact structure shown and described, the scope of the invention being defined by the appended claims.

It should be noted that that part of the base 22 carrying the adjustable abutment screw is substantially larger and materially heavier than its other end portion on which the indicator is mounted, one reason for this arrangement being to permit such smaller lighter part of the base to overhang from the bed of the machine during its use or while out of use without danger of the appliance falling off and injuring the more or less delicate indicator.

I claim:

1. A truing fixture of the character described, comprising in combination, a base adapted to rest on the bed of a press, an abutment adjustable as to height on said base, and an indicator mounted on said base, said abutment and indicator being adapted to be shifted into and out of cooperative relation with the body to be straightened by sliding the base on which both of them are mounted on the press bed.

2. A truing fixture of the character described, comprising in combination, a base adapted to bear on the bed of a press, an abutment having a screw-threaded adjustable mounting on said base whereby the height of the abutment may be easily regulated, and an indicator vertically adjustable on said base, said abutment and indicator being adapted to be shifted into and out of cooperative relation with the body to be straightened by sliding said base on which both of them are mounted on said press bed.

3. A truing fixture of the character described, comprising in combination, a base adapted to bear on the bed of a press, an abutment having a flat top face adapted to be engaged by the work and having a screw-threaded adjustable mounting on said base whereby the height of the abutment may be easily regulated, and an indicator vertically adjustable on said base and including a scale and a pivoted arm cooperating with said scale and adapted to contact with the work, said abutment and indicator being designed to be shifted into and out of cooperative relation with the body to be straightened by sliding said base on which both of them are mounted on said press bed.

4. A truing fixture of the character described, comprising in combination, a base adapted to rest on the bed of a press and having one end portion thereof substantially heavier than the opposite end portion, an abutment adjustable as to height mounted on the heavier part of said base, and an indicator mounted on the lighter portion of said base, said abutment and indicator being adapted to be shifted into and out of cooperative relation with the body to be straightened by sliding the base on which both of them are mounted on the press bed.

In witness whereof I have hereunto set my hand.

GAILARD E. WEAVER.